United States Patent
McIntosh

(10) Patent No.: US 6,169,799 B1
(45) Date of Patent: Jan. 2, 2001

(54) METHOD AND APPARATUS FOR AUTOMATIC TELEPHONE AREA-CODE DIALING

(75) Inventor: P. Stuckey McIntosh, Atlanta, GA (US)

(73) Assignee: Home Wireless Networks, Inc., Norcross, GA (US)

( * ) Notice: Under 35 U.S.C. 154(b), the term of this patent shall be extended for 0 days.

(21) Appl. No.: 09/017,002

(22) Filed: Feb. 2, 1998

(51) Int. Cl.$^7$ .................................................. H04M 1/00
(52) U.S. Cl. .......................................... 379/355; 379/354
(58) Field of Search ................................. 379/354–357, 379/216

(56) References Cited

U.S. PATENT DOCUMENTS

| | | | |
|---|---|---|---|
| 4,503,288 | * 3/1985 | Kessler | 379/357 |
| 4,939,774 | 7/1990 | Sawada . | |
| 5,157,719 | 10/1992 | Waldman . | |
| 5,394,462 | * 2/1995 | Maemura | 379/355 |
| 5,475,743 | * 12/1995 | Nixon et al. | 379/354 |
| 5,528,680 | 6/1996 | Karpicke . | |
| 5,710,808 | 1/1998 | Eaton . | |
| 5,917,904 | * 6/1999 | Theis | 379/356 |

FOREIGN PATENT DOCUMENTS

| | | |
|---|---|---|
| 2 296 158 | 4/1996 | (GB) . |
| WO 95/01693 | 1/1995 | (WO) . |
| WO 97/36432 | 10/1997 | (WO) . |
| WO 97/36436 | 10/1997 | (WO) . |
| WO 97/11546 | 3/1999 | (WO) . |

OTHER PUBLICATIONS

International Search Report in corresponding International Application No. PCT/US99/01742 mailed Jun. 1, 1999.

Miller, George A., "The Magical Number Seven, Plus or Minus Two: Some Limits on Our Capacity for Processing Information," *The Psychological Review*, 63:81–97 (1956).

* cited by examiner

*Primary Examiner*—Wing F. Chan
(74) *Attorney, Agent, or Firm*—James L. Ewing, IV; Kilpatrick Stockton LLP

(57) ABSTRACT

A method and apparatus for automatic area code dialing includes a processor, software, and a memory for storing telephone numbers. At a dial tone, a caller dials a ten digit number. The processor sends an area code dial request to the caller for future calls. The caller can confirm the request of the dialed number as a frequently-dialed number. The processor stores the number as a seven-digit portion and an area code portion. On subsequent calls to only the seven-digit portion of the number, the processor compares the seven-digit number to a group of stored numbers. If a match is found, the processor transmits both the seven-digit number and its corresponding area code.

20 Claims, 7 Drawing Sheets

METHOD AND APPARATUS FOR AUTOMATIC TELEPHONE AREA-CODE DIALING

BACKGROUND OF THE INVENTION

1. Field of the Invention

The present invention is directed to a method and apparatus for automatically dialing a telephone area code and, more particularly, to a method and apparatus for storing the area codes for frequently-dialed seven-digit telephone numbers.

2. Background

Within recent years, the number of telephone area codes within the U.S. has increased dramatically. The recent increase in facsimile machines, computers with modems, second and third phone lines, cellular phones and pagers has resulted in an explosion in demand for new telephone numbers, and exhausted the existing area code resources. In the ten-year period between 1984 and 1994, twenty five new area codes were assigned in the United States. In the 24-month period between January, 1995, and December, 1996, twenty three new area codes were introduced in the United States. In 1996, the number of available 800 numbers (toll-free numbers) was exhausted, resulting in the introduction of a new toll-free area code. The demand on telecommunications services is being felt globally, as well. Great Britain and France are two of the countries that have announced a restructuring of their numbering systems.

As a result of the increase in the number of area codes, individuals are required to memorize more numbers. In Los Angeles, for instance, the use of five area codes compels the memorization of ten-digit telephone numbers. Studies have shown, however, that the memorization of numerous ten-digit numbers is very difficult. Indeed, seven digits were originally chosen for telephone numbers because of an article by George A. Miller, entitled "The Magical Number Seven, Plus or Minus Two: Some Limits on Our Capacity for Processing Information," originally published in The Psychological Review, 1956, vol 63, pp. 81–97. In that article, Mr. Miller states that the number of sequential digits that may be comfortably memorized by any person is between five and nine (seven, plus or minus two). Beyond nine, individuals begin to truncate digits, resulting in a loss of information. Thus, ten digits may be beyond the memorization skills of many telephone users. The memorization problem will become even more prevalent when one includes international area codes and country codes.

In the workplace, the use of ten-digit telephone numbers decreases efficiency. The inability to memorize an entire ten-digit telephone number may lead to an increase in the number of mis-dials. In addition, dialing time is increased for those individuals who must look up telephone numbers in address books and databases. As a result of the increased dialing time, less time is spent performing more valuable and productive tasks.

Speed dialing, the most popular method for handling multiple-area code telephone numbers, is not adequate. Speed dialing allows a single keypad button to replace an entire dialing sequence. Unfortunately, speed dialing is usually limited to the storage of only nine sequences ("O" is reserved for telephone company use). Speed dialing cannot accommodate the dozens of ten-digit telephone numbers that an individual may need to store. Even where two-digit speed dialing is allowed, it would require the memorization of ninety-nine numbers for each telephone number-speed dialing number correspondence. Thus, the memorization problem would not be overcome.

SUMMARY OF THE INVENTION

In a preferred embodiment of the present invention, a telephone user dials a ten-digit telephone number, which may be stored as a frequently-dialed number. Thereafter, when the caller re-dials the seven-digit number, the correct area code is automatically dialed also. Thus, the caller need not remember numerous ten-digit telephone numbers.

More particularly, in a preferred embodiment of the present invention, a telephone set includes a handset, a base unit, a processor, software, and memory. In accordance with instructions from the software, the processor provides a synthetic dial tone to the caller. When the caller enters a ten-digit number, the processor sends a double-burst tone to the caller requesting that the area code be automatically dialed for all further calls to the seven-digit portion of this number. If this is a frequently-dialed number, the caller confirms the area code dial request by pressing, for instance, the pound key. The processor then stores the area code and seven-digit number in memory. When the caller re-dials the seven-digit portion of the number, the processor compares the seven-digits to a list of stored numbers. If a match is found, the processor attaches the proper area code and transmits the entire number to the network.

In another embodiment of the invention, the processor can store the ten digit number in the course of dialing, coupled with the processor receiving a command from the use to store the ten digit number In a third embodiment of the present invention, an end office includes software, a processor and memory for storing frequently-dialed seven-digit telephone numbers and their corresponding area codes. When a caller dials a ten-digit number, the end office transmits an area code dial request to the caller, such as a double-burst dial tone. The caller confirms the area code request by pressing the pound key, for instance. The end office then stores the area code and seven-digit telephone number in a local memory. Thereafter, when the caller dials only the seven-digit number, the end office compares the number to a group of stored numbers. If a match is found, the call is automatically switched to the caller using the corresponding area code information.

It is, therefore, an object of the present invention to allow callers to accommodate the ten digit telephone number paradigm simply by dialing seven digits.

It is an additional object of the present invention to allow callers to be burdened only with knowing telephone numbers to the extent they are psychologically able while accommodating the telecommunications infrastructure need for additional digits in the area code to accommodate more addresses.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION OF THE PREFERRED EMBODIMENT

Reference will now be made in detail to a preferred embodiment of the invention, examples of which are illustrated in the accompanying drawings. Wherever possible, the same reference numbers will be used throughout the drawings to refer to the same or like parts.

Figure 1:
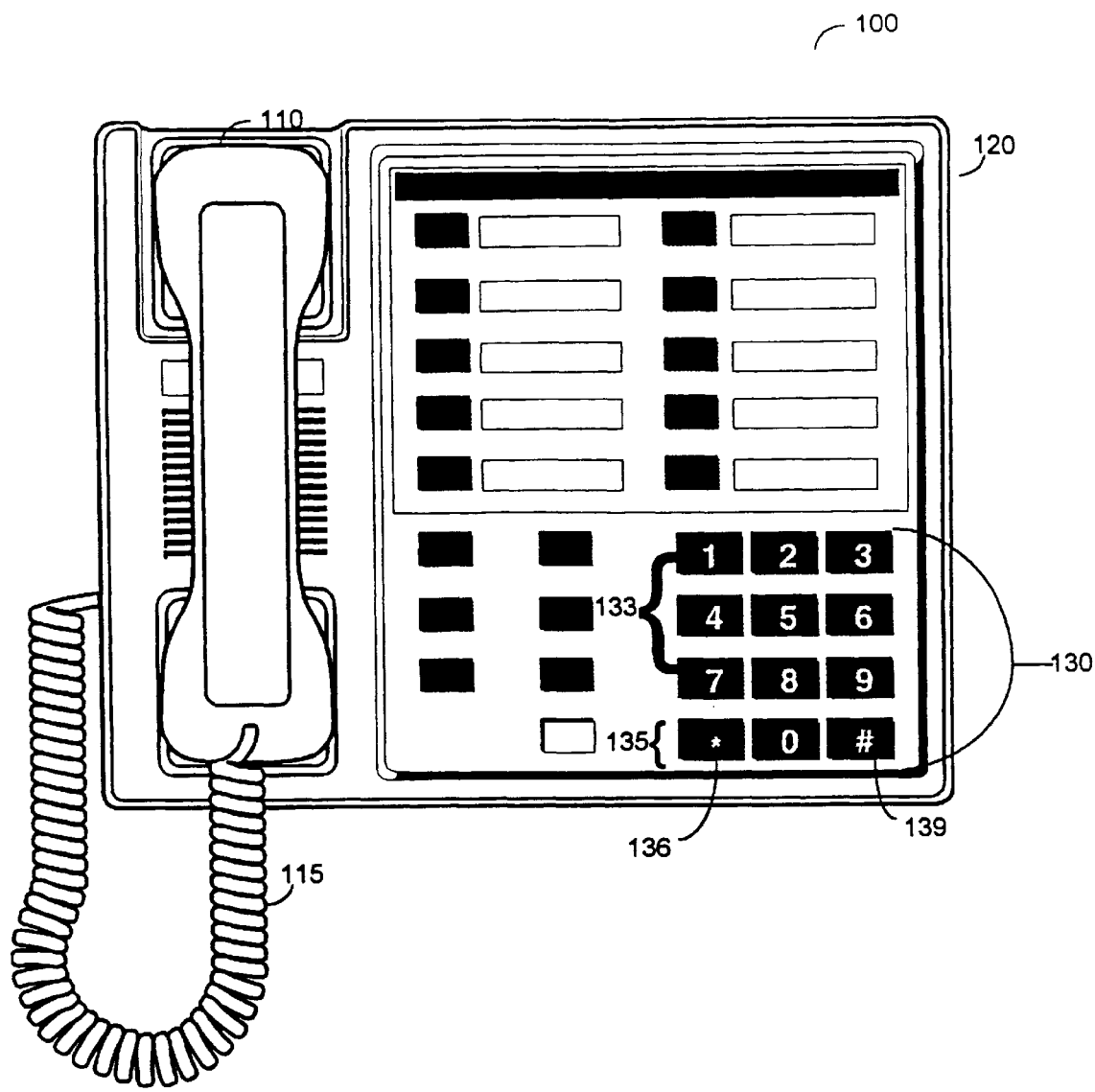
FIG. 1 is an illustration of a telephone set, in accordance with a preferred embodiment of the present invention.

FIG. 1 is an illustration of a telephone set 100, in accordance with a preferred embodiment of the present invention. The telephone set 100 includes a handset 110 and a base unit 120. The handset 110 is coupled to the base unit 120 by a cord 115. Although a corded telephone set 100 is illustrated, a cordless telephone set, a cellular telephone, a wireless telephone, PCS, and other telephone systems may also be used. The base unit 120 is coupled to a telephone wall jack (not shown) by a second cord 117. The wall jack connects the telephone set 100 to an outside telephone network. The telephone set 110 further includes a keypad 130 comprised of a plurality of numeric keys 133 and symbol keys 135. The symbol keys 135 include a "star" key 136 and a "pound" key 139. The keypad 130 may include additional keys, such as a HOLD key, a volume key, and a plurality of additional line keys.

Figure 2:
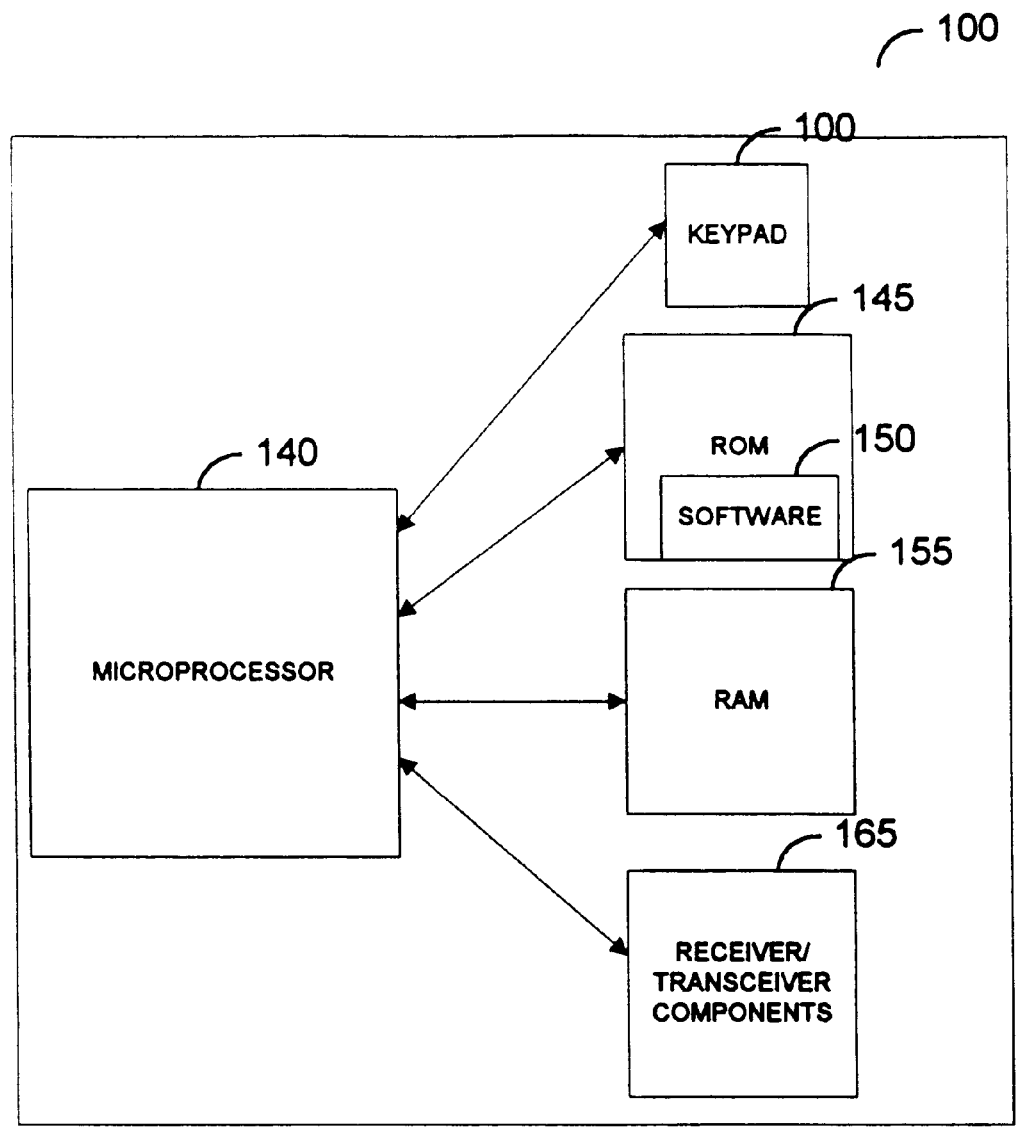
FIG. 2 is a block diagram of the telephone set of FIG. 1

FIG. 2 is a block diagram of components for controlling telephone set 100. The telephone set 100 includes a processor 140 for performing commands stored in a read-only memory ("ROM") 145. Memory 145 stores software 150, which contains instructions for performing the steps described herein and which embodies instructions to be carried out by processor 140. A random access memory ("RAM") 155 stores temporary data that may be used by programs stored in memory 145. The base unit 120 may further include receiver/transmitter components 165 that performs audio processing, such as voice digitization and synthetic dial tone creation. Telephone set 100 may include additional components.

Figure 3:
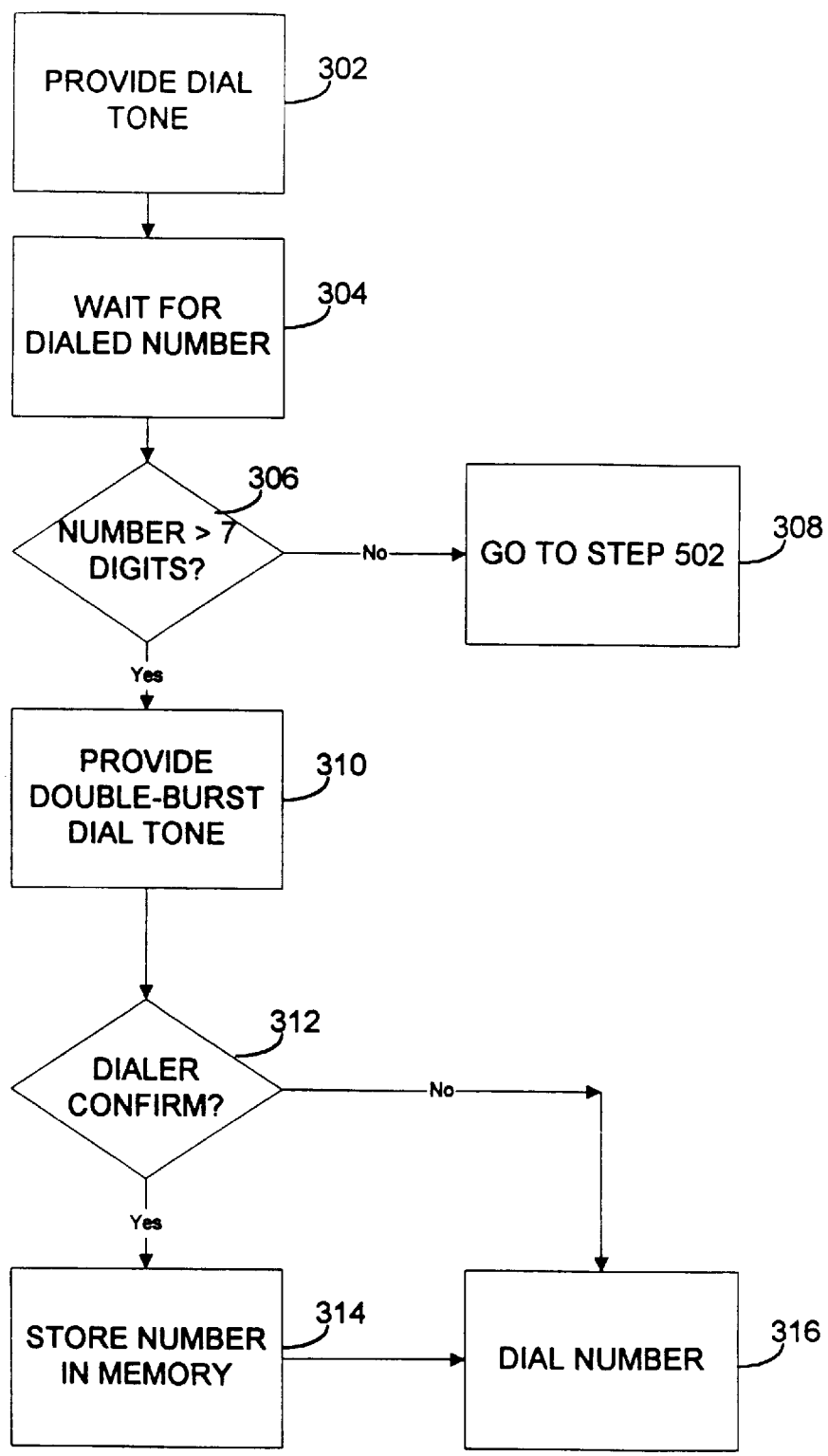
FIG. 3 is a flow chart illustrating steps performed by a program in ROM of the telephone set of FIG. 1.

FIG. 3 is a flow chart illustrating steps performed by processor 140, in accordance with program 150 stored in ROM 145. Telephone processing begins at step 302 with the provision of a synthetic dial tone upon lifting the handset 110 from the cradle of the base unit 120. The synthetic dial tone is provided locally by the processor 140 and components 165 and not by the outside telephone network. The processor 140 then waits for the caller to dial a telephone number. If the dialed telephone number includes more than seven digits, the processor 140, in step 312, inserts a double-burst dial tone or a similar audible tone into the normal dial tone stream. The double burst acts as an area code associate request to the calling party. More particularly, the double burst prompts the calling party to confirm that the dialed telephone number is a frequently-dialed telephone number. Instead of a double burst, the processor may emit a synthesized voice, flash an LED on a handset, or provide a screen prompt on a handset screen. The calling party may confirm that the dialed telephone number is a frequently-dialed number by pressing a symbol key, such as the pound key. When the pound key 139 is pressed, the processor 140 stores the dialed telephone number in memory 155. The calling party may confirm using other methods, such as a pressing a dedicated key, a soft key, or speaking phrases into the mouthpiece, such as "yes," "store," or "confirm." Voice recognition software resident in the telephone would then associate the number with an area code.

Figure 4:
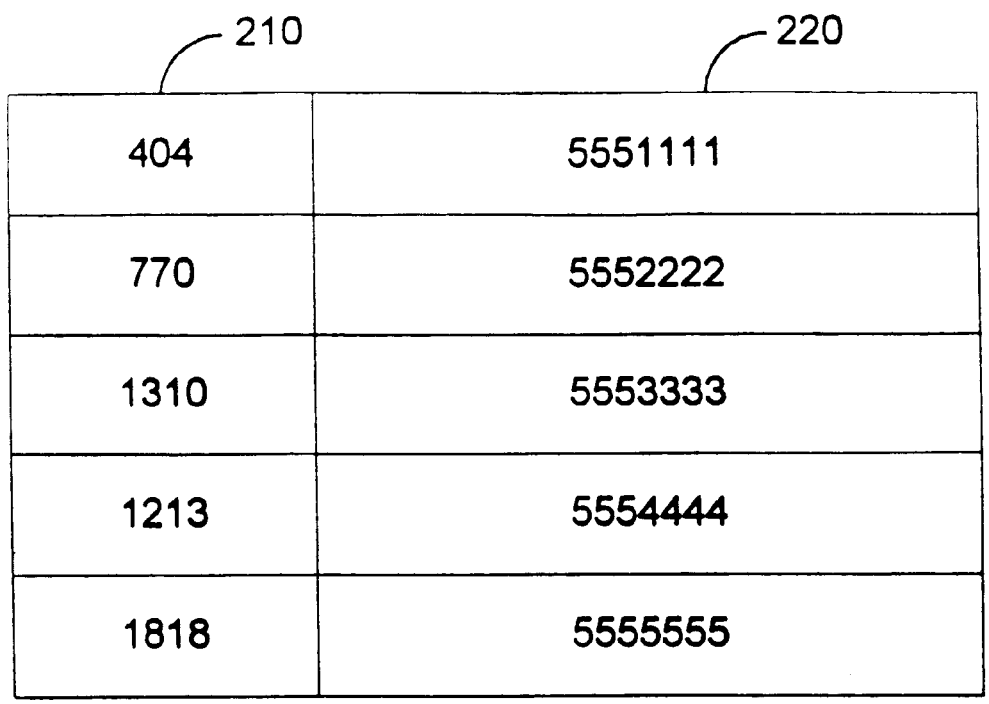
FIG. 4 is a block diagram of a telephone number stored in RAM.

The telephone number and area code association are stored in memory 155, as shown in FIG. 4. The telephone number includes an area code portion 210 and a called party number portion 220. More particularly, the processor stores the last seven digits of the telephone number as the called party number portion 220. The digits preceding the called party number portion 220 are stored as the area code portion 210. The area code portion 210 may include simply the area code of the called party, but may also include international area codes and/or country codes in addition to prepended calling digits, such as "0", "1", or "9". In FIG. 4, for example, a dialed number "4045551111" is stored as "404" in area code portion 210 and "5551111" is stored in called party number portion 220.

Once the telephone number is stored in memory 155, the processor 140 instructs the receiver/transmitter component 165 to deliver an audible signal to the calling party, such as a second double-burst dial tone. The audible signal is an indication to the calling party that the number and area code have been stored.

Figure 5:
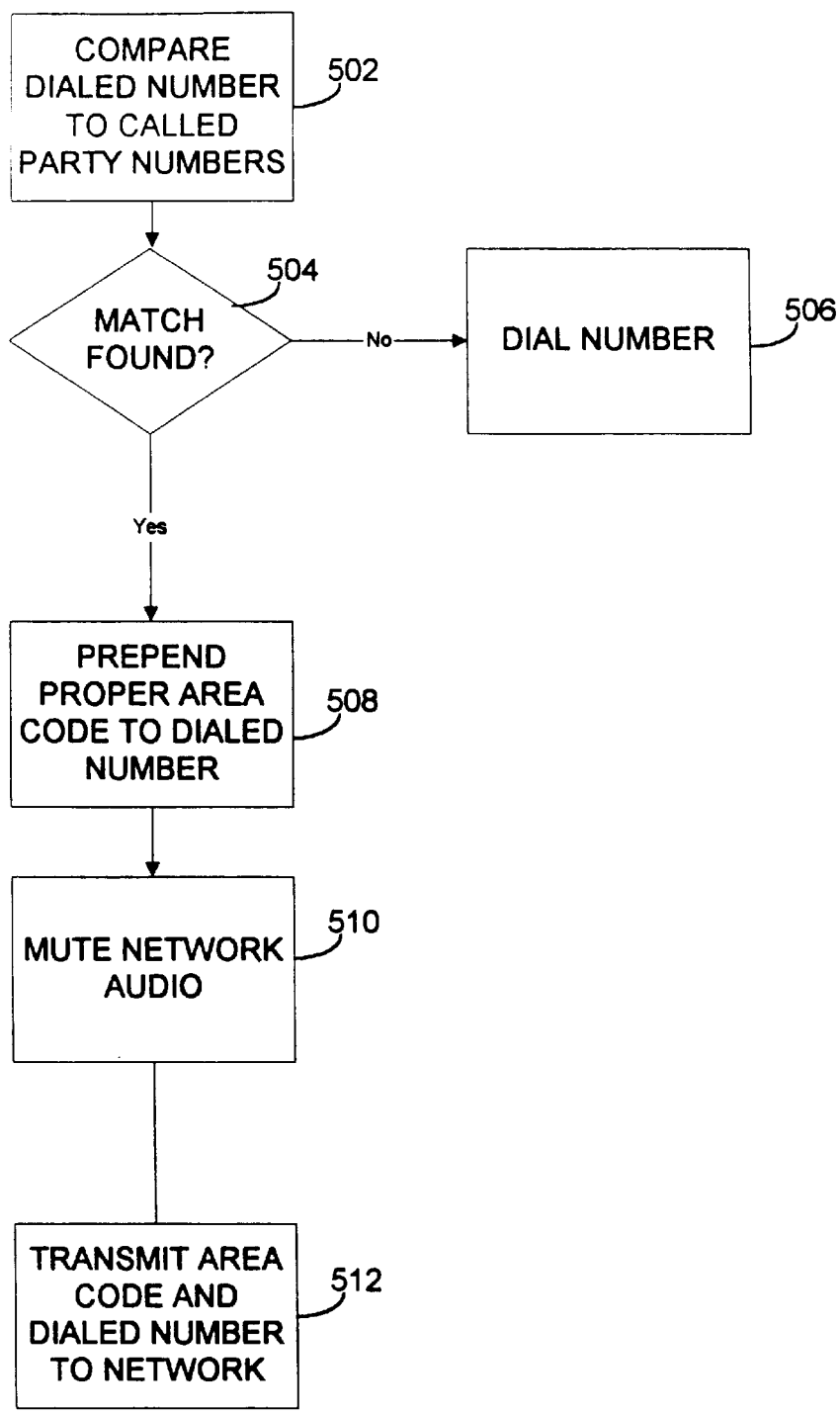
FIG. 5 is a flow chart illustrating processing that occurs during the dialing of a seven-digit telephone number.

FIG. 5 is a flow chart illustrating processing that occurs during the dialing of a seven-digit telephone number. While dialing, the calling party hears a handset-provided synthetic group of keypad tones associated with the dialed digits. In step 502, the processor 140 compares the called party telephone number to a group of called party number portion 220 stored in memory 155. If the called number matches a called party number portion 220 in step 504, the processor 140 prepends the corresponding area code portion 210 to the called party number portion 220 and transmits the area code portion 210 and called party number portion 210 to the telephone network. During this transmission, network audio may be muted in step 510 by the processor 140 to prevent the calling party from hearing the entire telephone number being transmitted to the network. Once the numbers have been burst into the telephone network, network audio may resume. The calling party would then hear the usual ringing or busy signal associated with a normal telephone call. If the called party telephone number does not match a called party number portion 220 stored in memory 155, the processor 140 transmits only the seven-digit dialed telephone number to the network.

Figure 6:
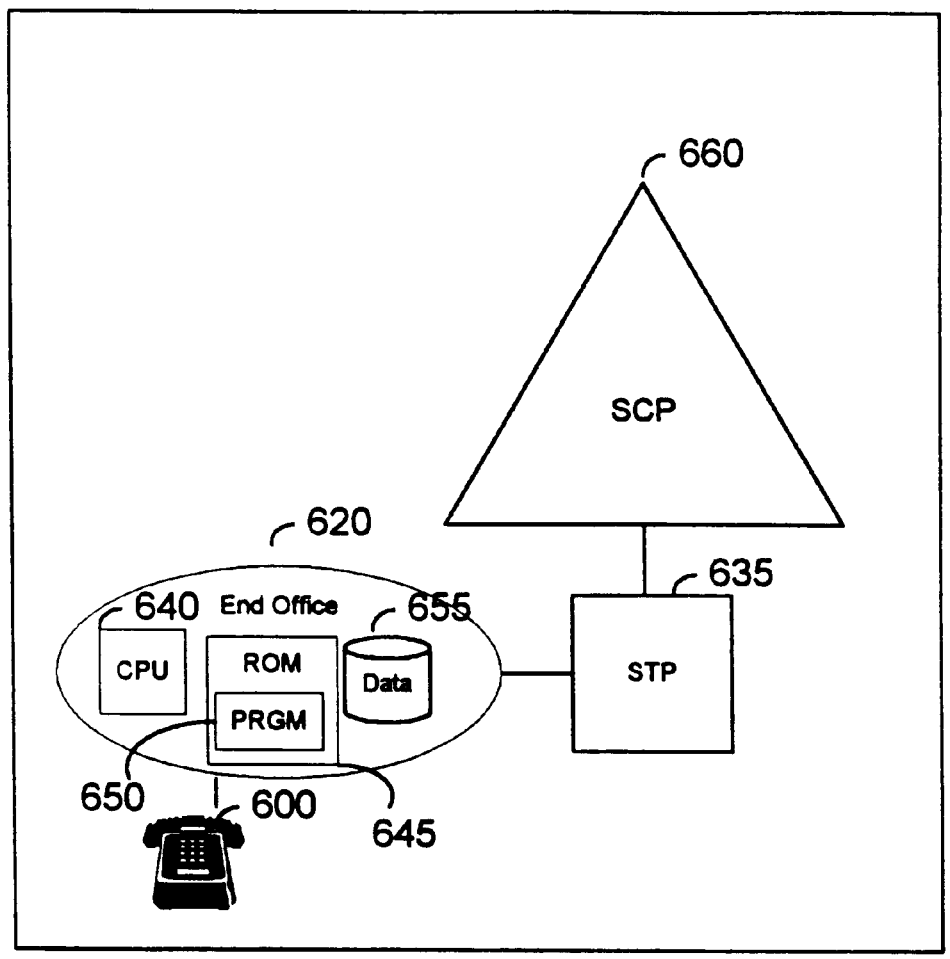
FIG. 6 is a telephone network, in accordance with another embodiment of the present invention.

FIG. 6 is an example of a telephone network 600, in accordance with another embodiment of the present invention. Various nodes within the network may be interconnected via a signaling system, such as Signaling System #7 ("SS7"). SS7 signaling is described in detail in "Signaling System #7", by Travis Russell and published by McGraw-Hill, which is hereby incorporated by reference herein. The network 600 includes a calling party 600 connected to a local exchange carrier end office 620. The end office 620 includes a programmable switch that switches calls from the calling party to other nodes in the network 600. The end office 620 includes a processor 640, a database 655 with database memory, a read-only memory 645. A program 650 stored in memory 645 contains instructions to be carried out by the processor 640. The network 600 may include additional SS7 components, such as a signal transfer point ("STP") 635 or other network element for switching messages, a service node ("SN"), and a signal control point 660 ("SCP") for processing messages.

Figure 7:
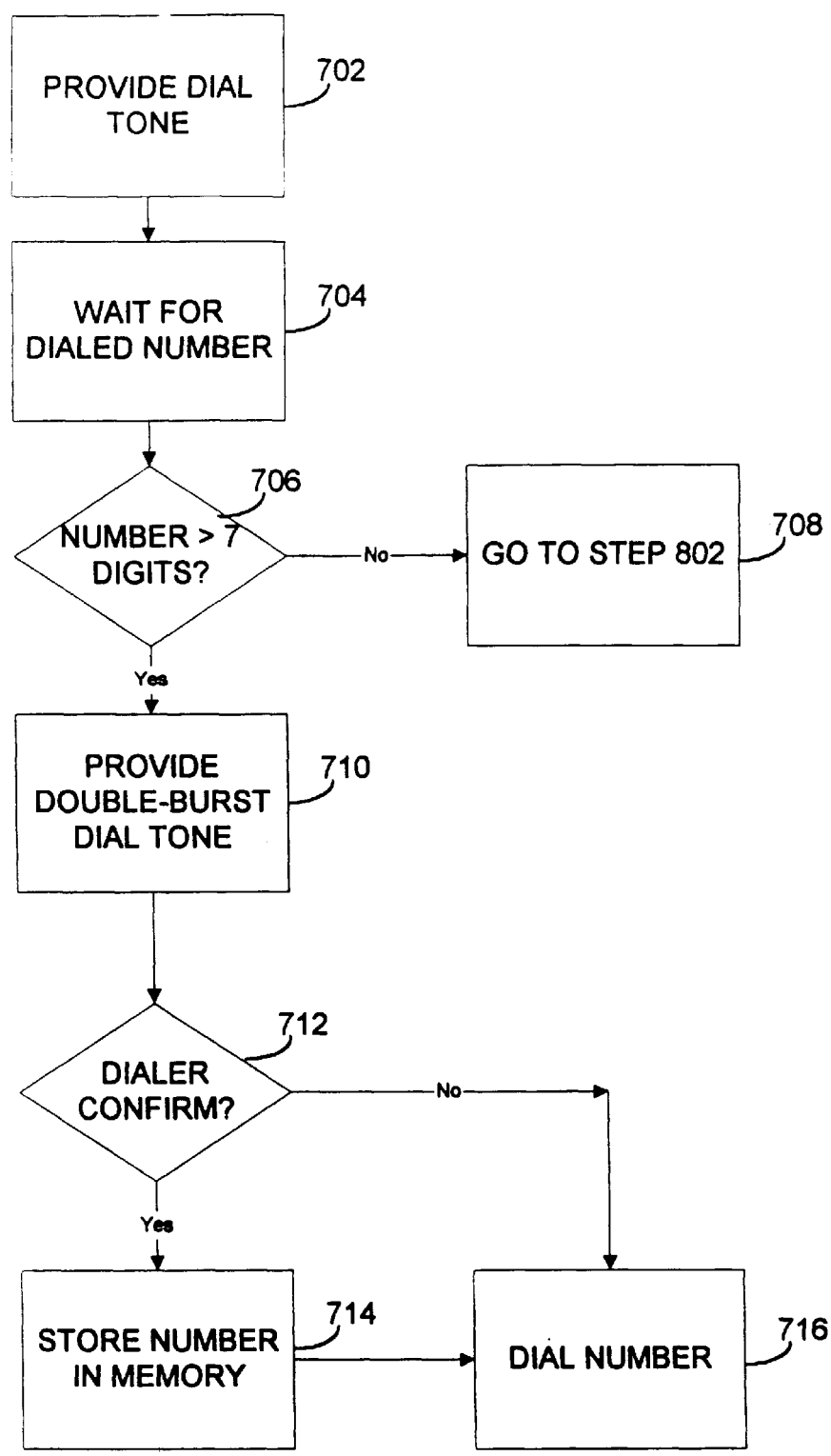
FIG. 7 is a flow chart illustrating steps performed by a program in ROM of the end office of FIG. 6.

FIG. 7 is a flow chart illustrating steps performed by the processor 640, in accordance with instructions from program 650. In a first step 702, the switch 620 provides a dial tone to the calling party 610 upon lifting the handset from the base unit. Next, the processor 640 waits for the calling party 610 to dial a telephone number. If the dialed telephone number includes more than seven digits, the processor 640, in step 710, inserts a double-burst dial tone into the normal dial tone stream. The calling party 610 may confirm that the dialed telephone number is a frequently-dialed number by pressing a a symbol key, such as the pound key. When the pound key is pressed, the processor 640 stores the telephone number in memory 655, as shown in FIG. 4. Details of the fields 210, 220 of the dialed telephone number were discussed above, with respect to the first embodiment of the present invention.

The following processing occurs during the dialing of a seven-digit telephone number in the system shown in FIG. 6. The calling party 610 dials the called party telephone number. Next, in step 802, the processor 640 compares the called party telephone number to a group of called party number portion 220 stored in memory 665. If the called number matches a called party number portion 220, the processor 640 prepends the corresponding area code portion 210 to the called party number portion 210 and switches the call to the appropriate node in the network 600 for the calling party having the telephone number and prepended area code. If the called party telephone number does not match a called party number portion 210 stored in memory, the processor 640 transmits only the seven-digit called party telephone number to the network 600.

The present invention may also be implemented as an in-line device between a telephone and a wall jack. The device may include a processor and other components necessary to implement the features described herein. The device monitors telephone calls made from one or more telephones. When a frequently-dialed number is encountered, the device sends an area code associate request to the user. The area code associate request may be a double-burst dial tone, an audible tone, a synthesized, or another audible method for alerting the user. The user would then indicate that she wishes to associate the area code with the frequently-dialed number. The device then stores the number and its associated area code in an internal memory. When the user later enters the telephone number, the device associates the stored area code with the telephone number and transmits the area code and dialed number out to the telephone network.

The methods described above may also be used in connection with improved "smart" speed-dialing. A major drawback of speed-dialing is the requirement that users enter commonly-dialed telephone numbers into a speed-dial memory. When a user frequently dials a number, however, he may neglect to include the number in speed dialing. To overcome this problem, the present invention may include processing for storing dialed telephone numbers and comparing dialed telephone numbers over a predetermined period of time. An algorithm or microprogram stored in ROM may be used, for example, to determine the dialing frequency of particular telephone numbers. When the program recognizes that a number has been dialed frequently, the program may prompt the user to store the number as a speed dial number or as a frequently-dialed seven digit number. If the number is a speed dial number, the program may prompt the user for a speed-dial digit.

The smart speed-dial function described above may be combined with other services, such as Caller ID. For example, the microprogram may automatically associate a frequently-dialed number with a Caller ID name. Similarly, outgoing calls or call attempts may be considered along with incoming calls in deciding whether to prompt for speed dial or seven digit dialing.

The foregoing discloses preferred embodiments of the invention. Various modifications, adaptations, and alternative embodiments thereof, including programming within a Private Branch Exchange, various ways of prompting the user for storage and use of numbers, and other techniques for example, may be made within the scope and spirit of the present invention. The invention is further defined by the following claims:

What is claimed is:

1. A method for dialing a telephone number of a called party, comprising:
    storing the telephone number of the called party wherein the storing comprises:
        detecting entry of the telephone number of the called party during dialing of the called party, the telephone number including both an area code and a called number;
        sending an area-code associate request to the calling party in response to the dialing of the area code and called number, the area-code associate request being an inquiry to store the telephone number;
        receiving an area-code associate confirmation from the calling party; and
        in response to the area-code associate confirmation, storing the area code and the called number;
    after the storing of the area code and the called number, detecting another entry of the called number;
    retrieving the area code associated with the called number when only the called number is detected and not the area code; and
    dialing the telephone number of the called party using both the area code and the called number;
    wherein the sending of the area-code associate request is sent automatically in response to the entry of the telephone number and the dialing of the telephone number occurs after entry of only the called number and not the area code.

2. The method as set forth in claim 1, wherein sending the area-code associate request comprises emitting an audible double-burst dial tone.

3. The method as set forth in claim 1, wherein sending the area-code associate request comprises emitting an audible tone.

4. The method as set forth in claim 1, wherein between the storing of the telephone number and the detecting of another entry of the called number, the method further comprises detecting an entry of at least one other telephone number and dialing the other telephone number.

5. The method as set forth in claim 1, wherein receiving the area-code confirmation comprises detecting an audible signal.

6. The method as set forth in claim 5, wherein detecting the audible signal comprises detecting a DTMF tone.

7. The method as set forth in claim 1, wherein the storing of the telephone number is performed by a telephone device.

8. The method as set forth in claim 1, wherein the storing of the telephone number is performed within a network.

9. The method as set forth in claim 1, further comprising providing a synthetic dial tone to the calling party and muting audio from the telephone network during detecting the entry of the called number.

10. The method as set forth in claim 1, wherein retrieving the area code comprises comparing the called party number to a plurality of stored called party numbers.

11. A telephone set, comprising:

a speaker for producing sounds for the calling party;

a microphone for detecting sounds from the calling party;

a keypad for allowing the caller party to enter digits in a telephone number;

a processor coupled to the keypad for controlling dialing of the digits;

a memory for storing the telephone number entered by the calling party, the telephone number including a called party number and an area code;

means for sending an area code associate request to the calling party in response to the entry of the area code and called number, the area-code associate request being an inquiry to store the telephone number;

means for placing the telephone number in the memory in response to an area code associate confirmation received from the calling party; and means for dialing the stored area code and the called party number when only the called party number is subsequently entered.

12. The telephone set as set forth in claim 11, further comprising means for providing a synthetic dial tone to the calling party and means for muting audio from the telephone network during entry of the digits.

13. The telephone set as set forth in claim 11, wherein the means for sending the area code associate request transmits an audible tone to the calling party.

14. The telephone set as set forth in claim 11, wherein the means for sending the area code associate request transmits a synthetic voice to the calling party.

15. The telephone set as set forth in claim 11, wherein the means for sending the area code associate request transmits a double-burst dial tone to the calling party.

16. The telephone as set forth in claim 11, wherein the telephone set is a cordless telephone.

17. The telephone as set forth in claim 16, wherein the telephone set is a wireless telephone.

18. The telephone set as set forth in claim 16, wherein the telephone set is a cellular telephone.

19. The telephone set as set forth in claim 16, wherein the telephone set is a digital telephone.

20. A telephone end office, comprising:

a processor;

a database for storing a telephone number entered by a calling party, the telephone number including a called party number and an area code;

means for sending an area code associate request to the calling party in response to the calling party entering digits for the telephone number, the area-code associate request being an inquiry to store the telephone number;

means for placing the telephone number in the database in response to receiving an area code associate confirmation from the calling party; and means for routing a telephone call to the calling party based upon the stored area code and called party number to a telephone network when only the called party number is subsequently dialed and not the area code;

wherein the end office requires the caller to send only the area code confirmation and the end office thereafter routes the telephone call to the calling party after the calling party enters only the called party number and not the area code.

* * * * *